(12) United States Patent
Cha et al.

(10) Patent No.: US 11,351,812 B2
(45) Date of Patent: Jun. 7, 2022

(54) EMBLEM STRUCTURE

(71) Applicants: HYUNDAI MOTOR COMPANY, Seoul (KR); KIA MOTORS CORPORATION, Seoul (KR)

(72) Inventors: Dong Eun Cha, Hwaseong-si (KR); Jin Young Yoon, Gimpo-si (KR); Ki Hong Lee, Seoul (KR); Hyun Kyung Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 139 days.

(21) Appl. No.: 17/032,609

(22) Filed: Sep. 25, 2020

(65) Prior Publication Data
US 2021/0379926 A1 Dec. 9, 2021

(30) Foreign Application Priority Data
Jun. 5, 2020 (KR) .................. 10-2020-0068524

(51) Int. Cl.
  *B32B 3/10* (2006.01)
  *B44F 1/04* (2006.01)
  *B60R 13/00* (2006.01)

(52) U.S. Cl.
  CPC ............ *B44F 1/045* (2013.01); *B60R 13/005* (2013.01); *B32B 2250/05* (2013.01); *B32B 2307/412* (2013.01); *B32B 2307/416* (2013.01); *B32B 2307/418* (2013.01)

(58) Field of Classification Search
  CPC ......... B32B 3/10; B32B 3/14; B32B 2250/03; B32B 2250/418; B44F 1/045
  See application file for complete search history.

(56) References Cited

U.S. PATENT DOCUMENTS

| 11,094,235 | B2* | 8/2021 | De Castro Turner ....................... G09F 21/048 |
| 2003/0087047 | A1* | 5/2003 | Blauer .................. B60R 13/005 428/31 |
| 2015/0140903 | A1* | 5/2015 | Janssen ................... B44C 1/224 451/29 |
| 2017/0113628 | A1* | 4/2017 | Sugiura ................. B32B 15/088 |
| 2020/0207145 | A1* | 7/2020 | Yoshida .................. C23C 16/06 |

FOREIGN PATENT DOCUMENTS

KR 10-0792550 B1 1/2008

* cited by examiner

*Primary Examiner* — Elizabeth E Mulvaney
(74) *Attorney, Agent, or Firm* — Morgan, Lewis & Bockius LLP

(57) ABSTRACT

The present disclosure discloses an emblem structure in which an emblem is coupled to a part in an integral form, thereby minimizing the amount of protrusion and an image is implemented in a distorted form, and advancing the quality of a product. The emblem structure includes a base layer, an image layer disposed on an outer surface of the base layer or to be spaced apart from the outer surface, and a transparent layer deposited on the base layer to cover the image layer. The transparent layer is configured such that light is transmitted and refracted and that the light reflected by the base layer and the image layer is lost, thereby improving visual recognition of the image layer.

11 Claims, 4 Drawing Sheets

EMBLEM STRUCTURE

CROSS REFERENCE TO RELATED APPLICATION

The present application claims the benefit of priority to Korean Patent Application No. 10-2020-0068524, filed on Jun. 5, 2020 in the Korean Intellectual Property Office, the entire contents of which is incorporated herein for all purposes by reference.

TECHNICAL FIELD

The present disclosure relates to an emblem structure in which an emblem is coupled to a part in an integral form to minimize the amount of protrusion and implement an image in a distorted form, thereby advancing the quality of a product.

BACKGROUND

Generally, a vehicle is provided with an emblem made of a logo, which is variously disposed the interior and exterior thereof. Such an emblem is manufactured by plating a metal film on a plastic surface to make the metallic feeling and to reflect an object like a mirror when viewed from the outside. That is, when the metal film is plated and applied to the emblem of the plastic material, the emblem is actually a plastic material but the user may feel a metallic property with respect to the emblem. Such an emblem is molded as a logo by injecting plastic, and a metal plating layer such as chrome is formed on the outer surface of the emblem so that the user may feel a metallic property. In addition, this emblem is attached to a front surface or a rear surface of the vehicle using double-sided tape or the like.

However, a conventional emblem has a problem in that the emblem is removed from the part or easily damaged due to washing or aging. In addition, as the image through the emblem is fixed in a manner of expressing the metallic feeling, there is a problem in that it is weak to emphasize productivity, thereby not sufficiently expressing the value of the emblem.

The information disclosed in the Background section above is intended merely to aid in the understanding of the background of the present disclosure, and should not be taken as acknowledgement that this information forms any part of prior art.

SUMMARY OF THE DISCLOSURE

The present disclosure is proposed to solve the above problem, and an object of the present disclosure is to provide an emblem structure in which an emblem is coupled to a part in an integral form to minimize the amount of protrusion and implement an image in a distorted form, thereby advancing the quality of a product.

An emblem structure according to the present disclosure for achieving the object includes: a base layer; an image layer disposed on an outer surface of the base layer or to be spaced apart from the outer surface; and a transparent layer deposited on the base layer to cover the image layer, and configured such that light is transmitted and refracted and that the light reflected by the base layer and the image layer is lost, thereby improving visual recognition of the image layer.

The image layer includes a metal film having a light transmittance lower than that of the transparent layer.

The image layer includes fine protrusions along an outer circumferential surface.

The image layer is deposited to protrude outward from the outer surface of the base layer, and has an inclined circumferential surface such that a width is narrowed from the inside toward the outside of the image layer in a thickness direction of the image layer.

The transparent layer is composed of a first transmissive layer deposited to fill the remaining region of the circumference of the image layer in the base layer and having a heat resistance material, and a second transmissive layer laminated on the outer surfaces of the image layer and the first transmissive layer.

The transparent layer is deposited on the base layer and entirely surrounds the image layer.

The base layer includes an engraved portion recessed from the outer surface, the image layer is deposited on the engraved portion, and the transparent layer is deposited to cover the base layer and the image layer.

The transparent layer is composed of a third transmissive layer deposited to fill the engraved portion, a fourth transmissive layer laminated on the outer surfaces of the base layer and the third transmissive layer and having a heat resistance material, and a fifth transmissive layer laminated on the outer surface of the fourth transmissive layer.

The engraved portion is formed to have an inclined circumferential surface such that a width increases from the inside toward the outside of the image layer in a thickness direction of the image layer.

The image layer includes a fine pattern on the outer surface.

The image layer is in contact with the outer surface of the base layer.

According to the emblem structure formed of the aforementioned structure, the emblem is coupled to the part in an integral form to minimize the amount of protrusion and implement an image in a distorted form, thereby advancing the quality of the product.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinafter, an emblem structure according to a preferred exemplary embodiment of the present disclosure will be described with reference to the accompanying drawings.

Figure 1:
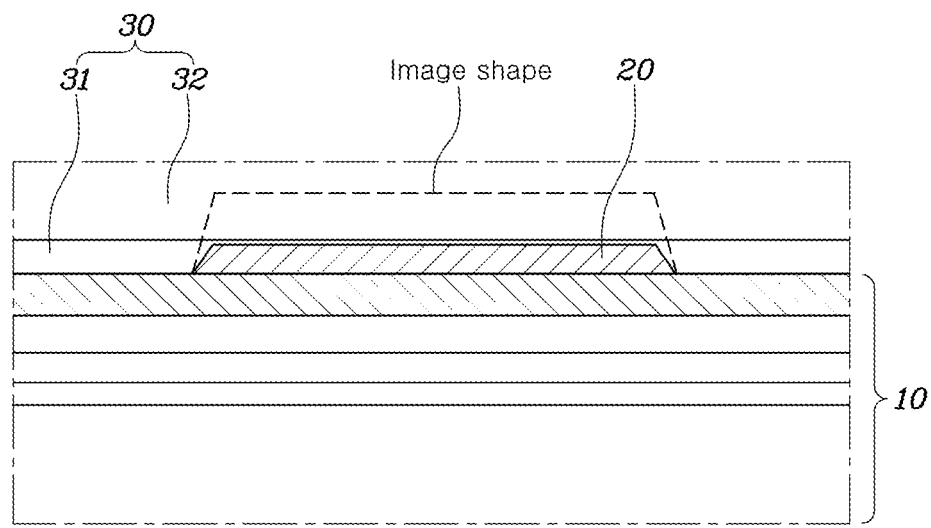
FIG. 1 is a diagram illustrating an emblem structure according to an exemplary embodiment of the present disclosure.
Figure 2:
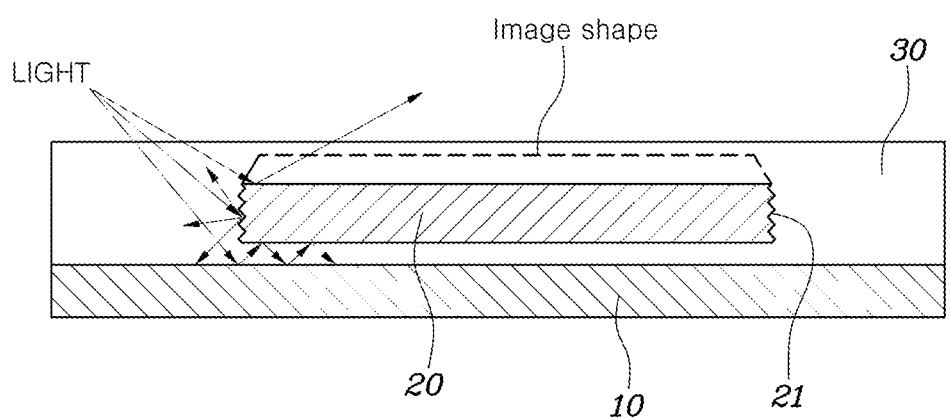
FIG. 2 is a diagram illustrating an emblem structure according to another exemplary embodiment of the present disclosure.
Figure 3:
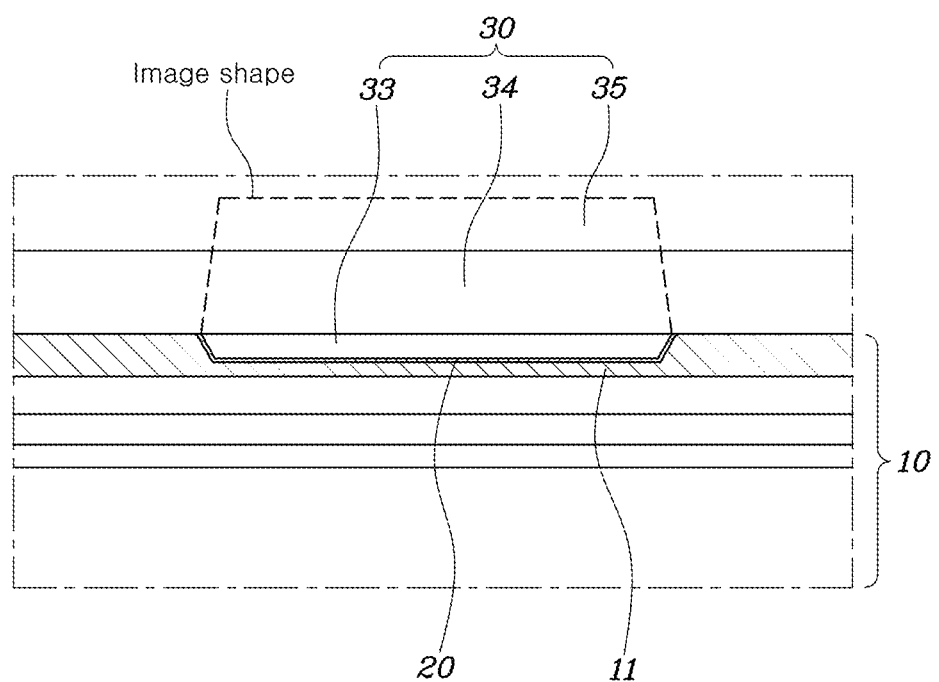
FIG. 3 is a diagram illustrating an emblem structure according to still another exemplary embodiment of the present disclosure.
Figure 4:
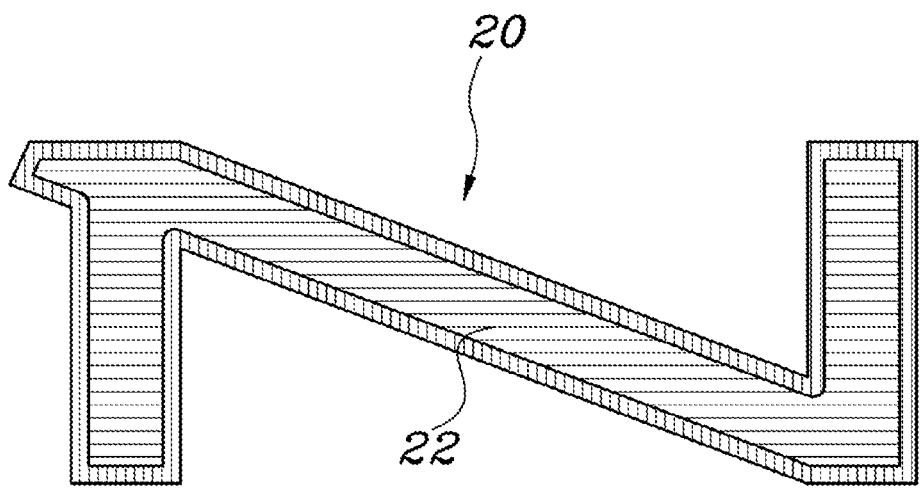
FIG. 4 is a diagram for specifically explaining the emblem structure.
Figure 5:
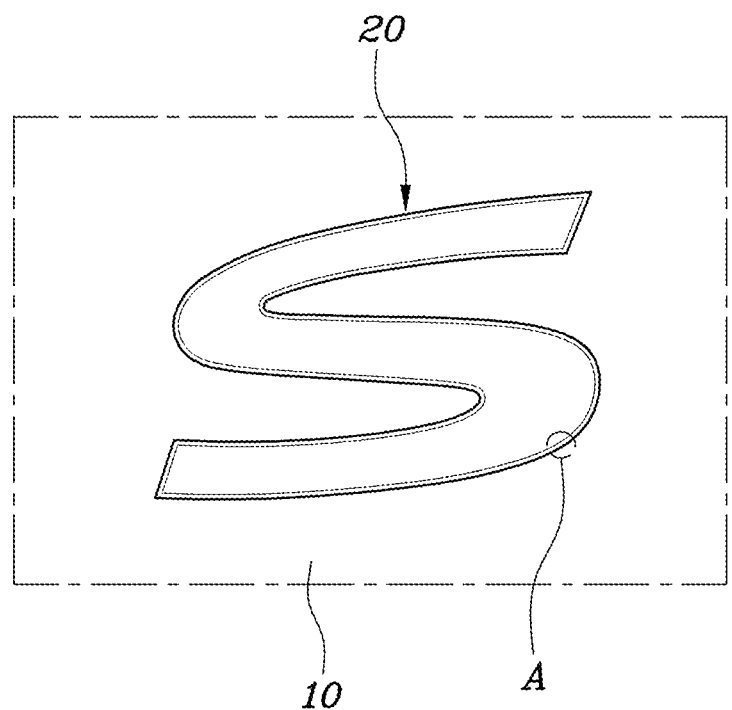
FIG. 5 is a diagram illustrating the effect of the emblem structure.

FIG. 1 is a diagram illustrating an emblem structure according to an exemplary embodiment of the present disclosure, FIG. 2 is a diagram illustrating an emblem structure according to another exemplary embodiment of the present disclosure, FIG. 3 is a diagram illustrating an emblem structure according to still another exemplary embodiment of the present disclosure, FIG. 4 is a diagram for specifically explaining the emblem structure, and FIG. 5 is a diagram illustrating the effect of the emblem structure.

The emblem structure according to the present disclosure includes a base layer 10; an image layer 20 disposed on the outer surface of the base layer 10 or to be spaced apart from the outer surface and having an image shape exposed to the outside; and a transparent layer 30 deposited on the base layer 10 to cover the image layer 20, configured to transmit light and generate refraction of light, so that reflected light by the base layer 10 and the image layer 20 is lost, thereby improving the visual recognition of the image layer 20.

Here, the base layer 10 is a part provided with an emblem, and may be provided with a transparent dielectric layer on the surface thereof.

The image layer 20 is disposed spaced apart from the outer surface or the outer surface of the base layer 10. The image layer 20 may be formed in a logo shape to be implemented by the emblem. In addition, the image layer 20 is made of a metal film with light transmittance lower than that of the transparent layer 30 and configured so that light is reflected and scattered. The image layer 20 may be made of metal materials of various materials such as chromium, silver, nickel, gold, and aluminum, and deposited on the outer surface of the base layer 10 in various deposition methods such as sputtering, evaporation, and chemical vapor deposition.

The transparent layer 30 is a transparent material and has light transmittance. Of course, the transparent layer 30 may be made of a translucent material, and various materials such as ultraviolet (UV), urethane, and ceramic may be selected. Particularly, light entering into the transparent layer 30 is refracted. Accordingly, when light is incident on the emblem according to the present disclosure, light scattering occurs in the base layer 10 and light scattering also occurs in the image layer 20 and light is emitted, and the phases of the light emitted from the base layer 10 and the image layer 20 are reversely-phased by the transparent layer 30 so that reflected light is lost. As described above, the reflected light of the light incident on the emblem is lost, thereby improving the visual recognition of the visually visible image layer 20. In addition, the shape of the image layer 20 is distorted by a refractive index of the transparent layer 30 deposited on the outer surface of the image layer 20, so that a phenomenon in which the image layer 20 appears to be embossed or engraved occurs.

In addition, the image layer 20 allows fine protrusions 21 to be formed along an outer circumferential surface thereof (e.g., side surface of the image layer 20), so that light scattering of light incident on the circumferential surface of the image layer 20 occurs. This is for inducing the Fresnel effect, and as the light is dispersed by the fine protrusions 21 formed on the circumferential surface of the image layer 20, the image layer 20 exposed from the base layer 10 to the outer surface looks more vivid. In addition, there is an effect that the phenomenon that the image layer 20 appears to be embossed or engraved becomes more pronounced.

Here, when the thicknesses of the image layer 20 and the transparent layer 30 are adjusted, a loss rate of the reflected light may be adjusted, thereby diversifying the image exposed to the outside.

As described above, the emblem according to the present disclosure has an image which is implemented in a distorted form to advance productivity through the differentiated image, avoids a simple attachment method to reduce the thickness protruding from the part, and also prevents a problem separated from the part.

The aforementioned present disclosure may be implemented in various exemplary embodiments, and each of the exemplary embodiments will be described below.

As an exemplary embodiment, as illustrated in FIG. 1, the image layer 20 is deposited to protrude outward from the outer surface of the base layer 10, and as the width is gradually narrowed from the inside toward the outside, the circumferential surface may be formed obliquely.

As described above, the image layer 20 is in contact with the outer surface of the base layer 10, and has a predetermined thickness and thus is deposited to protrude from the outer surface. Accordingly, as the reflected light due to light scattering occurring in the base layer 10 and the image layer 20 is lost from the transparent layer 30, the image layer 20 protruding to the outermost side of the base layer 10 is visually concentrated. In addition, the image layer 20 is distorted in shape by the refraction by the transparent layer 30, thereby causing the visual effect as if the image protrudes.

In addition, the image layer 20 may be formed to have an inclined circumferential surface as the width is gradually narrowed from the inside toward the outside. Accordingly, the visual effect occurs in which the image layer 20 protrudes as if it smoothly extends from the base layer 10. In addition, the Fresnel effect is induced by the circumferential surface of the image layer 20 so that the image layer 20 is clearly visible. Here, fine protrusions may be further formed on the circumferential surface of the image layer 20.

Meanwhile, the transparent layer 30 may by composed of a first transmissive layer 31 deposited to fill the remaining region of the circumference of the image layer 20 in the base layer 10 and having a heat resistance material, and a second transmissive layer 32 laminated on the outer surfaces of the image layer 20 and the first transmissive layer 31. The heat resistance material may include a heat resistance bonding film such as a Polyetheretherketone (PEEK) film.

That is, the transparent layer 30 is composed of the first transmissive layer 31 and the second transmissive layer 32, and the first transmissive layer 31 may be formed to have heat resistance. In the process of depositing the transparent layer 30 on the base layer 10, a phenomenon in which the base layer 10 expands or contracts may occur by an environmental change such as temperature. Accordingly, the first transmissive layer 31 deposited to cover the base layer 10 is configured to have heat resistance, thereby preventing deformation caused by expansion or contraction in the deposition process, thereby making it possible to manufacture a precise emblem. The second transmissive layer 32 is deposited on the outer surface of the first transmissive layer 31 to secure stability against scratch or corrosion. Here, the first transmissive layer 31 and the second transmissive layer 32 may be made of a transparent material, or may also be made of an opaque material.

As another exemplary embodiment according to the present disclosure, as illustrated in FIG. 2, the transparent layer 30 may be deposited on the base layer 10 and entirely surround the image layer 20.

Here, the image layer 20 may be disposed to be spaced apart from the base layer 10, and a gap may be generated between the base layer 10 and the image layer 20. Light may be incident on the gap between the base layer 10 and the image layer 20, and the light is reflected and moved into the gap between the base layer 10 and the image layer 20.

Accordingly, as the reflected light due to light scattering occurring outside the base layer 10 and the image layer 20 is lost from the transparent layer 30, the image layer 20 protruding to the outermost side of the base layer 10 is visually concentrated. In addition, the image layer 20 is distorted in shape by the refraction by the transparent layer 30, thereby causing the visual effect as if the image protrudes. In addition, light is incident on the gap generated by the image layer 20 spaced apart from the base layer 10, thereby causing the visual effect as if the image layer 20 is floating from the base layer 10.

As still another exemplary embodiment, as illustrated in FIG. 3, the base layer 10 may be formed with an engraved portion 11 recessed to have an image shape exposed to the outside, the image layer 20 may be deposited on the engraved portion 11, and the transparent layer 30 may be deposited to cover the base layer 10 and the image layer 20.

As described above, the engraved portion 11 having the same shape as the image layer 20 is recessed in the base layer 10, and the image layer 20 is deposited on the engraved portion 11, thereby causing the visual effect as if the image layer 20 enters into the inside of the base layer 10. Accordingly, as the reflected light due to light scattering occurring in the base layer 10 and the image layer 20 is lost from the transparent layer 30, the image layer 20 recessed to the inside of the base layer 10 is visually concentrated. In addition, as the image layer 20 is disposed to be recessed through the engraved portion 11 in the base layer 10, the thickness of the transparent layer 30 is secured, thereby increasing distortion phenomenon caused by the refraction by the transparent layer 30.

In addition, the engraved portion 11 may be formed to have the inclined circumferential surface as the width gradually increases from the inside toward the outside. Accordingly, there occurs the visual effect in which the image layer 20 is recessed as if it smoothly extends from the base layer 10. In addition, the Fresnel effect is induced by the circumferential surface of the image layer 20 so that the image layer 20 is clearly visible. Here, fine protrusions may be further formed on the circumferential surface of the image layer 20.

In another exemplary embodiment of the present disclosure, the transparent layer 30 may be composed of a third transmissive layer 33 deposited to fill the engraved portion 11, a fourth transmissive layer 34 laminated on the outer surfaces of the base layer 10 and the third transmissive layer 33 and having heat resistance, and a fifth transmissive layer 35 laminated on the outer surface of the fourth transmissive layer 34.

That is, since a phenomenon of expansion or contraction may occur in the process of depositing the transparent layer 30 on the base layer 10, the fourth transmissive layer 34 deposited to cover the base layer 10 is configured to have heat resistance to prevent deformation caused by expansion or contraction in the deposition process. Here, the third transmissive layer 33 is made of a transparent material, and as the third transmissive layer 33 is filled between the image layer 20 and the fourth transmissive layer 34, the distortion phenomenon of the image layer 20 is induced by the refraction effect by the third transmissive layer 33. The fifth transmissive layer 35 is deposited on the outer surface of the fourth transmissive layer 34 to secure stability against scratch or corrosion.

In another exemplary embodiment of the present disclosure, the image layer 20 may have fine patterns 22 formed on the outer surface of the image layer 20. For example, the fine patterns 22 may be micropatterns formed by micropatterning.

As illustrated in FIG. 4, a plurality of fine slits are formed in the outer surface of the image layer 20 to have a constant arrangement or an irregular arrangement, thereby diversifying the image of the emblem by the image layer 20. In addition, it is possible to apply a color to the fine patterns 22, thereby diversifying the design through the image layer 20.

Accordingly, as illustrated in FIG. 5, the present disclosure improves the visual recognition of the emblem. That is, as may be seen from the 'A' illustrated in FIG. 5, as the image is distorted, the image of the emblem may be exposed in the embossed or engraved shape, thereby recognizing the emblem more clearly.

In addition, the emblem is coupled to the part in an integral form, thereby minimizing the amount of protrusion, and the image is implemented in a distorted form, thereby advancing the quality of the product.

While the specific exemplary embodiments of the present disclosure have been illustrated and described, it will be apparent to those skilled in the art that various improvements and changes of the present disclosure are possible without departing from the technical spirit of the present disclosure provided by the appended claims.

What is claimed is:

1. An emblem structure comprising:
   a base layer;
   an image layer disposed on an outer surface of the base layer or to be spaced apart from the outer surface; and
   a transparent layer deposited on the base layer to cover the image layer, the transparent layer being configured such that light is transmitted and refracted and that the light reflected by the base layer and the image layer is lost, thereby improving visual recognition of the image layer.

2. The emblem structure according to claim 1,
   wherein the image layer includes a metal film having a light transmittance lower than a transmittance of the transparent layer.

3. The emblem structure according to claim 1,
   wherein the image layer includes fine protrusions along an outer circumferential surface of the image layer.

4. The emblem structure according to claim 1,
   wherein the image layer is deposited to protrude outward from the outer surface of the base layer, and has an inclined circumferential surface such that a width of the image layer is narrowed from an inside of the image layer toward an outside of the image layer in a thickness direction of the image layer.

5. The emblem structure according to claim 4,
   wherein the transparent layer includes:
   a first transmissive layer deposited to fill the remaining region of the circumference of the image layer in the base layer and having a heat resistance material; and
   a second transmissive layer laminated on the outer surfaces of the image layer and the first transmissive layer.

6. The emblem structure according to claim 1,
   wherein the transparent layer is deposited on the base layer and entirely surrounds the image layer.

7. The emblem structure according to claim 1,
   wherein the base layer includes an engraved portion recessed from the outer surface, the image layer is deposited on the engraved portion, and the transparent layer is deposited to cover the base layer and the image layer.

8. The emblem structure according to claim 7,
   wherein the transparent layer includes:
   a third transmissive layer deposited to fill the engraved portion;

a fourth transmissive layer laminated on the outer surfaces of the base layer and the third transmissive layer and having a heat resistance material; and a fifth transmissive layer laminated on the outer surface of the fourth transmissive layer.

9. The emblem structure according to claim 7,
wherein the engraved portion is formed to have an inclined circumferential surface such that a width of the engraved portion increases from an inside of the engraved portion toward an outside of the engraved portion in a thickness direction of the image layer.

10. The emblem structure according to claim 1,
wherein the image layer includes a fine pattern on an outer surface.

11. The emblem structure according to claim 1,
wherein the image layer is in contact with the outer surface of the base layer.

\* \* \* \* \*